United States Patent [19]

Datwyler, Jr.

[11] 4,144,747
[45] Mar. 20, 1979

[54] SIMULTANEOUSLY RESONATED, MULTI-MODE CRYSTAL FORCE TRANSDUCER

[75] Inventor: Walter F. Datwyler, Jr., Royal Oak, Mich.

[73] Assignee: The Bendix Corporation, Southfield, Mich.

[21] Appl. No.: 873,459

[22] Filed: Jan. 30, 1978

[51] Int. Cl.² .................................................. G01L 1/16
[52] U.S. Cl. .............................. 73/141 R; 73/DIG. 4; 310/338; 310/366; 331/163
[58] Field of Search ................. 73/DIG. 4, 517 A V, 73/580, 581, 702, 141 R; 310/320, 329, 338, 366; 331/163

[56] References Cited

U.S. PATENT DOCUMENTS

| 3,274,828 | 9/1966 | Pulvari | 73/DIG. 4 |
| 3,617,923 | 11/1971 | Paradysz | 310/320 X |
| 3,826,931 | 7/1974 | Hammond | 331/163 X |
| 4,039,969 | 8/1977 | Martin | 310/366 X |

Primary Examiner—Charles A. Ruehl
Attorney, Agent, or Firm—James R. Ignatowski; Russel C. Wells

[57] ABSTRACT

The invention is a single crystal force transducer in which the crystal is simultaneously resonated in two different modes having substantially the same frequency-temperature characteristics and different frequency-force characteristics. The difference in the change between the two resonant frequencies with a force applied to the crystal is therefore a temperature compensated signal indicative of the applied force. In the preferred embodiment the two resonant modes are anharmonic modes having a plurality of antinodes angularly disposed to each other.

31 Claims, 19 Drawing Figures

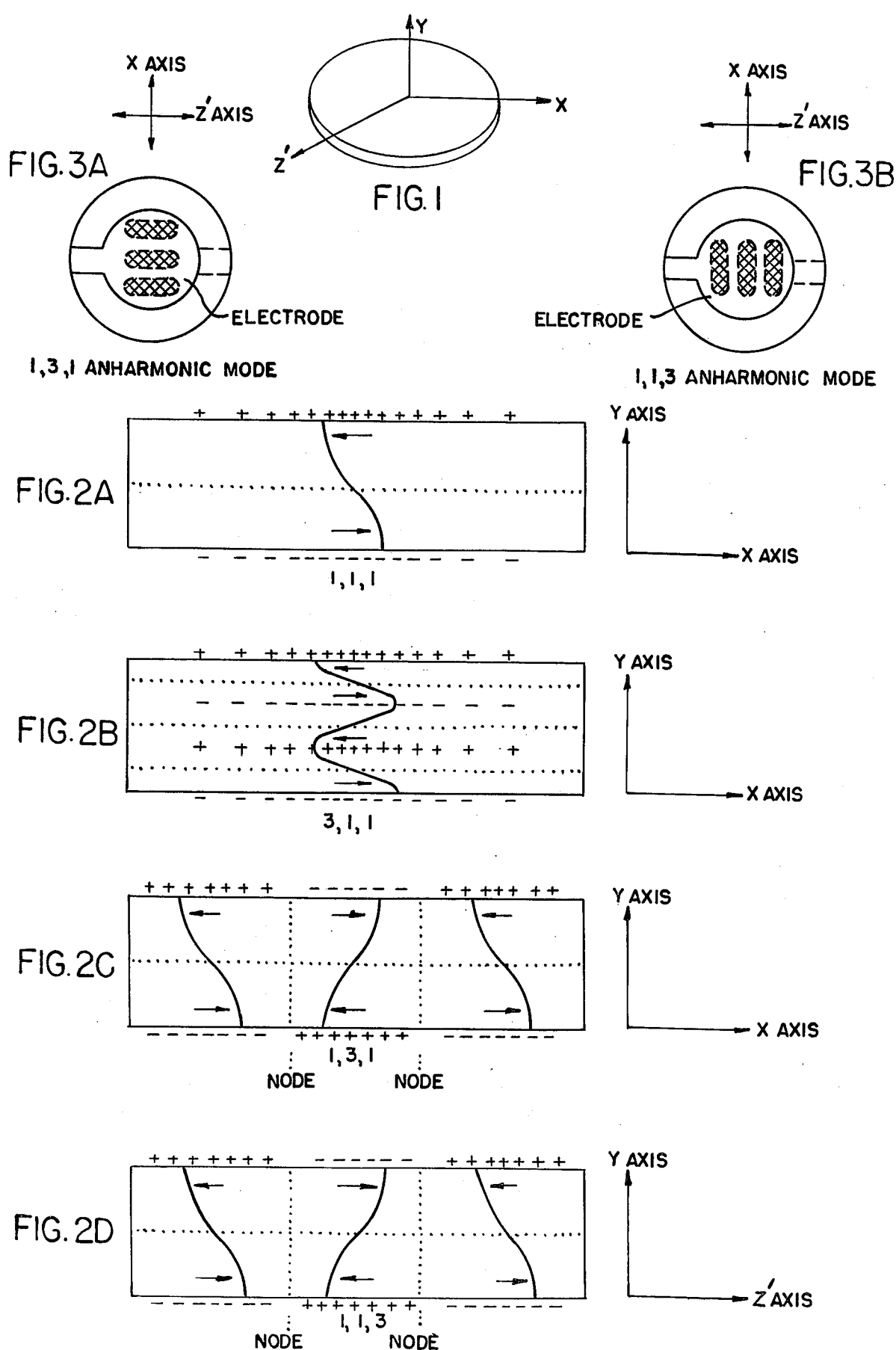

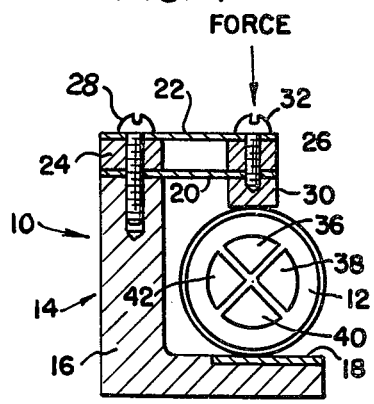
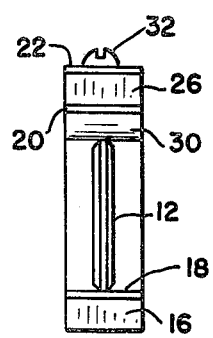
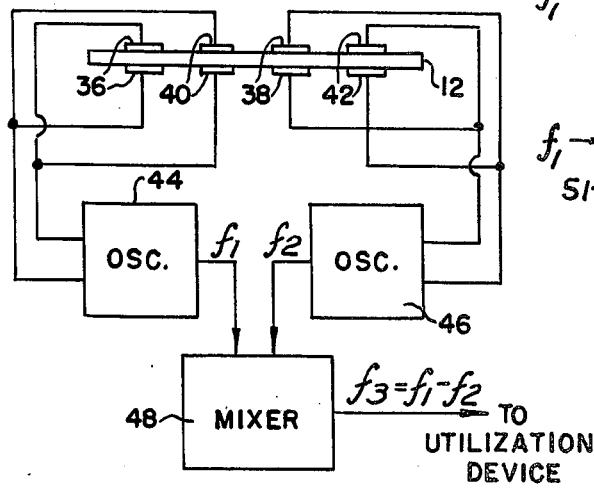
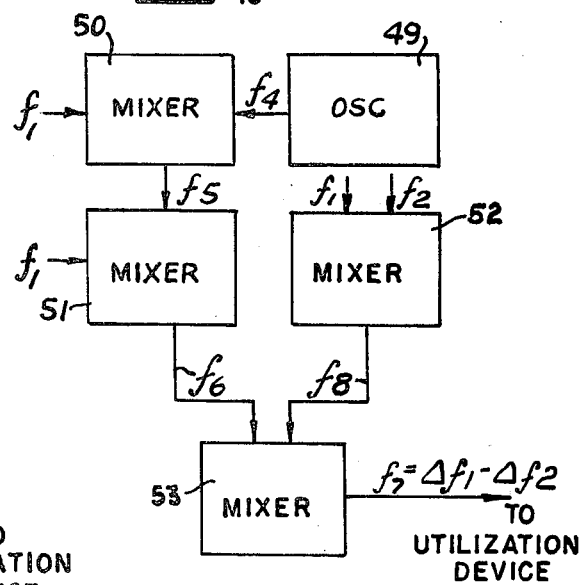
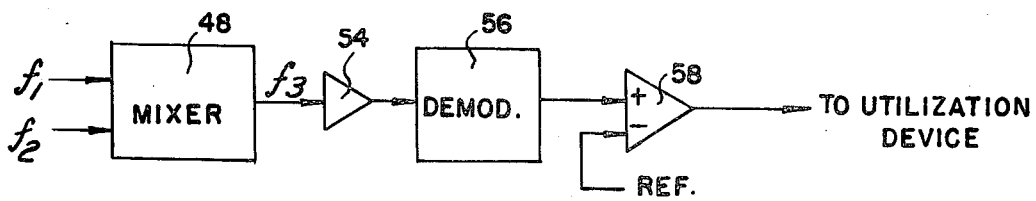

FIG. 11
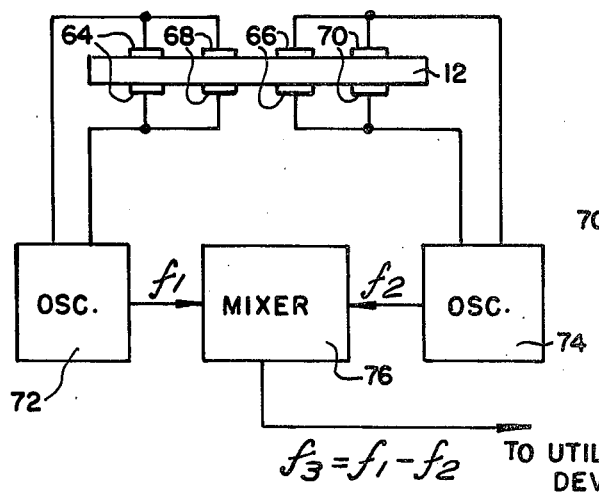
FIG. 13
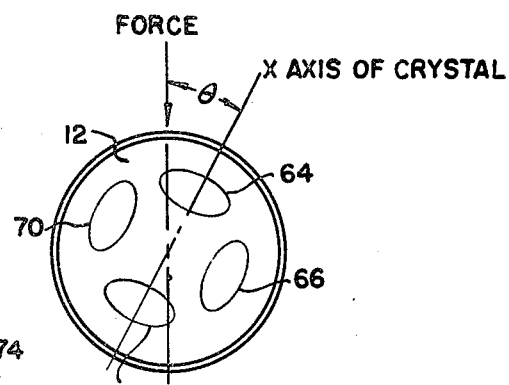
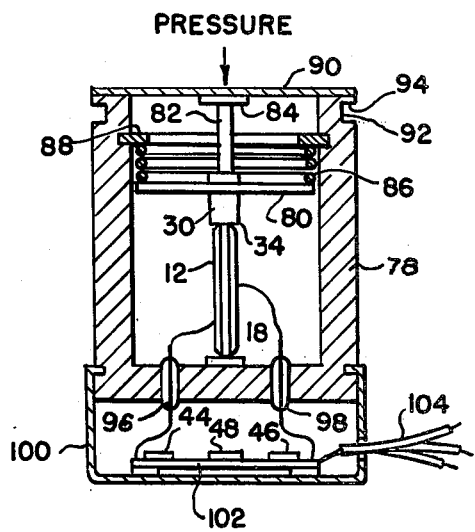
FIG. 14
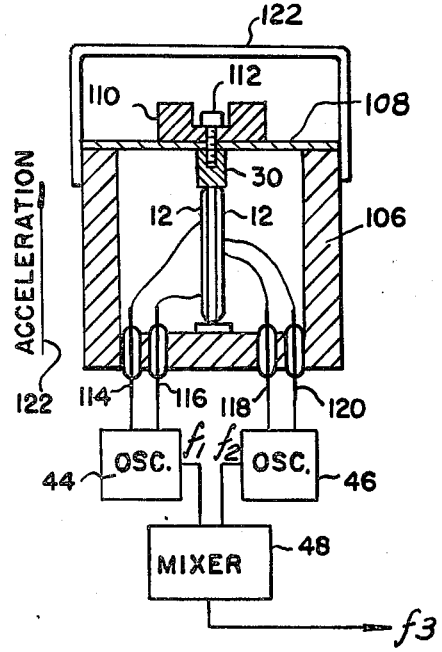
FIG. 15

SIMULTANEOUSLY RESONATED, MULTI-MODE CRYSTAL FORCE TRANSDUCER

FIELD OF THE INVENTION

The invention is related to the field of force transducers and in particular to the field of crystal force tranducers simultaneously resonated in two different modes.

PRIOR ART

It is well known in the art that a force applied to a piezoelectric crystal vibrating in the shear mode will produce a shift in the crystal's vibrational frequency as a function of the applied force. Force transducers based on this concept have been made in various forms for a variety of applications. Most of these transducers use AT cut quartz crystals which have maximum frequency stability in the temperature range from about 0° C. to +50° C. which for many applications is quite adequate. However, when wide dynamic range is required or the environent of the force transducer will exceed this nominal temperature range, some type of temperature compensation is taught by the prior art. Pulvari in U.S. Pat. No. 3,274,828 teaches using two identical quartz crystals having the same vibrational frequencies. The force is applied to only one of the two quartz crystals and the other is used as a reference. The change in frequency due to the applied force on the crystal is then obtained by mixing the two signals and extracting the difference. Corbett in U.S. Pat. No. 3,541,849 teaches time sharing a single piezoelectric crystal. In his force transducer, a counter is enabled with the force applied and then counts the number of oscillatory cycles that are generated in a fixed time period. The applied force is then electromechanically removed and the signal generated by the unloaded crystal (zero force) is used to count down the counter for an identical period of time. The residual count (cycles) remaining in the counter is a number indicative of the change in the frequency of the crystal due to the applied force. Another method of compensating for the change in frequency of the crystal with temperature is taught by Gerber in U.S. Pat. No. 3,020,423. In his device, Gerber uses a pair of bimetal elements which apply a force to an AT cut quartz crystal when the temperature exceeds the nominal linearity range. At the higher temperature range, the force is applied at one angle relative to the X axis of the crystal which produces a reduction in the crystal's frequency and conversely at the lower temperatures, the other bimetal element produces a force at a different angle relative to the X axis which produces an increase in the crystals frequency. Using this method, Gerber has indicated the temperature stable range of the crystal can be effectively doubled.

All of the above methods are relatively expensive and not applicable for a low cost mass produced force transducer. The use of two identical crystals as taught by Pulvari requires pretesting and selection of two identical crystals for each transducer. The time sharing taught by Corbett requires additional electromechanical means for periodically removing the applied force and the bimetal elements taught by Gerber compensate imperfectly, are subject to transient thermal errors and add complexity to the force transducer.

The force transducer disclosed herein uses only a single crystal and eliminates the need for any auxiliary electromechanical or bimetal elements disclosed by the prior art to achieve temperature compensation.

SUMMARY OF THE INVENTION

The invention is a temperature compensated single crystal force transducer in which the crystal is simultaneously resonated in two different modes. Unlike the crystal force transducers of the prior art which avoid resonating the crystal in an anharmonic mode, the present invention intentionally resonates the crystal in at least one anharmonic mode having a frequency-force characteristic which is different from the other mode at which the crystal is simultaneously resonated. Since the frequency temperature characteristics of the two modes are the same, the difference in the change in the frequencies with an applied force on the crystal is indicative of the applied force substantially independent of the ambient temperature.

In the preferred embodiment, an AT-cut quartz crystal is supported in a holder having means for applying the force to be measured along the crystal's X axis or at a predetermined angle thereto. The crystal has at least two sets of independent electrodes which are connected to two independent oscillators which simultaneously cause the crystal to resonate in two different modes. One of the resonant modes is an anharmonic mode such as the 1,1,2 or 1,1,3 mode having a plurality of antinodes angularly disposed to one of the crystal's axes. The other mode may be a harmonic mode or an anharmonic mode having its anti-nodes formed in a direction angularly disposed to the anti-nodes of the first resonant mode.

The signals indicative of the frequencies of the two modes are mixed and a difference signal having a frequency indicative of the applied force is extracted. Additional means may be provided to remove the frequency difference between the two resonant modes with a zero applied force. This means may subtract from the difference signal the zero load difference between the two modes, producing a signal having a frequency proportional to the applied load or may digitally remove the zero load frequency difference generating a digital number having a value proportional to the applied force. Alternatively, the difference frequency may be converted to an analog signal having a value indicative of the applied force.

The object of the invention is a crystal force transducer in which the crystal is simultaneously vibrated in two different modes to produce a signal indicative of the applied force and is substantially temperature independent. Another object is a crystal force transducer which is simultaneously vibrated in two modes, one of which has a frequency-force characteristic different from the other mode. Still another object, is a crystal force transducer which is simultaneously resonated in two different modes, wherein one of the modes is an anharmonic mode in which the anti-nodes are angularly disposed to one of the crystal axes. A final object is a crystal force transducer which is simultaneously resonated in two different anharmonic modes in which the two anharmonic modes have a plurality of anti-nodes angularly disposed to each other.

These and other objects of the invention will become apparent from a reading of the Specification in conjunction with the drawings.

BRIEF DESCRIPTION OF THE FIGURES

FIG. 1 is a perspective of a piezoelectric crystal showing the orientation of the axes.

FIG. 2-A is a cross-section of a crystal resonating in the harmonic 1, 1, 1 mode.

FIG. 2-B is a cross-section of a crystal resonating in the third overtone mode or 3, 1, 1 mode.

FIG. 2-C is a cross-section of a crystal resonating in the anharmonic 1, 3, 1 mode.

FIG. 2-D is a cross-section of a crystal resonating in the anharmonic 1, 1, 3 mode.

FIG. 3-A is a pictorial top view of a crystal resonating in the anharmonic 1, 3, 1 mode showing the formed loops.

FIG. 3-B is a pictorial top view of a crystal resonating in the anharmonic 1, 1, 3 mode showing the formed loops.

FIG. 4 is a cross-section of the disclosed force transducer.

FIG. 5 is a side view of the force transducer shown in FIG. 4.

FIG. 6 is a block diagram of the electrical circuit for generating a signal indicative of the applied force.

FIG. 7 is a block diagram of an auxiliary circuit to remove the zero load frequency difference.

FIG. 8 is a block diagram of an auxiliary circuit generating an analog signal indicative of the applied force.

FIG. 11 is a block diagram of the electrical circuit showing the manner in which the electrodes are connected to the oscillators.

FIG. 13 is a front view of the crystal showing the force being applied at an angle to the X axis.

FIG. 14 is a cross-section of a pressure sensor embodying the crystal force transducer.

FIG. 15 is a cross-section of an accelerometer embodying the crystal force transducer.

DETAILED DESCRIPTION OF THE INVENTION

Figure 9:
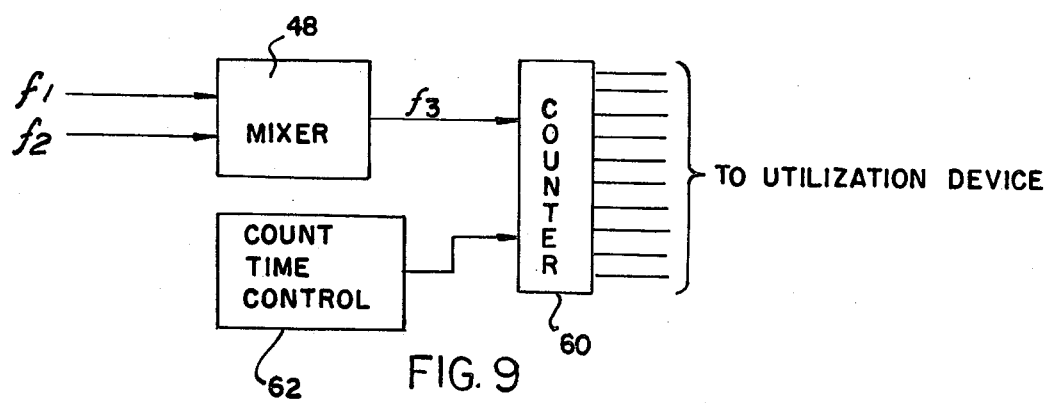
FIG. 9 is a block diagram of a digital auxiliary circuit to remove the zero load frequency difference.

A piezoelectric crystal, such as a quartz crystal, will exhibit resonance at a number of harmonic and anharmonic frequencies. The harmonic frequencies comprise the fundamental frequency and higher order frequencies (overtones) which are multiples of the fundamental frequency.

Anharmonic resonant frequencies (sometimes referred to as "inharmonic" frequencies) are those frequencies which are indicative of the crystal vibrating in a mode other than the fundamental mode and lie fairly close to the associated fundamental frequency. The difference between an anharmonic frequency and the associated harmonic frequency may be 2 percent or less. Because the anharmonic frequency lies so close to the associated fundamental frequency, extreme care is normally exercised in the design of crystal oscillators and filters to avoid or suppress the crystal from resonating at any of the anharmonic frequencies. The crystal force transducers of the prior art are designed so that the crystal resonates at its fundamental or at one of the overtone frequencies and not at an anharmonic resonant frequency.

The disclosed force transducer differs from the prior art in that it is designed so that the crystal is caused to resonate at at least one anharmonic frequency.

The harmonic and anharmonic resonant frequencies of a crystal are conventionally described by a three digit number. The first digit is indicative of the number of half waves that occur along a first axis (thickness) orthogonal to the plane of the crystal. The second digit represents the number of anti-nodes that occur along a second axis and the third digit represents the number of anti-nodes that occur along a third axis of the crystal, where the latter two axes are orthogonal in the plane of the crystal.

FIG. 1 shows a typical piezoelectric crystal. The AT cut quartz crystal is used as an example and the orientation of the X, Y and Z' axes are defined conventionally. However, for different types of piezoelectric crystals or even other cuts of a quartz crystal, other definitions of the axes may be used. The motion of the crystal and the electrical polarities as the crystal is resonated in its thickness shear mode are shown on FIGS. 2-A through 2-D. FIG. 2-A represents the crystal vibrating in its fundamental or 1,1,1 mode, i.e., there is only one half wave along the Y axis and only one common antinode along its X and Z' axis. FIG. 2-B represents a crystal resonating in its third overtone or 3, 1, 1 mode in which three half waves occur in the Y direction. FIGS. 2-C and 2-D represent the crystal resonating in this third anharmonic of the fundamental frequency which has three anti-nodes (2 nodes) along the X and Z' axes respectively. These modes are designated 1, 3, 1 and 1, 1, 3 respectively. The arrows on the figures denote the direction of movement in the shear direction. The nodes occur where the movement or distortion are minimum. As is known in the art, the crystal will also resonate at other harmonics and anharmonic frequencies.

Figure 10:
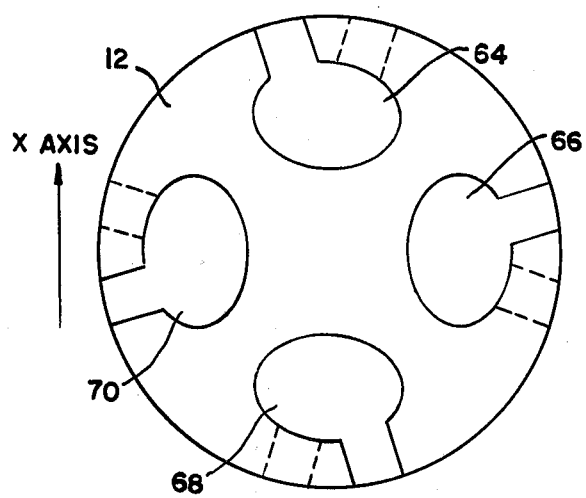
FIG. 10 is a view of an alternate electrode pattern for the crystal.

A pictorial representation of the antinodes as they actually exist in the X, Z' plane of the crystal for the 1, 3, 1 and 1, 1, 3 modes are shown on FIGS. 3-A and 3-B respectively. The cross-hatched sections under the electrodes show the anti-nodes which are regions of maximum displacement of the crystal surface as it resonates. The nodes occur between the anti-nodes and are regions of minimum displacement of the crystal's surfaces as it resonates. The difference between the two anharmonic modes is that the orientation of the two sets of anti-nodes are angularly disposed to each other. Photographs verifying the existence of these nodes and anti-nodes are shown in FIGS. 10.b and 10.c in "Quartz Resonator Handbook", edited by Roger E. Bennett prepared for The Department of the Army by Union Thermoelectric Division, Comptometer Corporation, Niles, Illinois; 1960. As noted in the pictures shown on FIG. 11 of the Quartz Resonator Handbook, the higher order modes are angularly disposed to the X axis and two different resonant modes may not have the orthogonal relationship of the 1, 1, 3 and 1, 3, 1 modes.

The frequency-temperature characteristics of the fundamental and anharmonic modes are nominally the same, therefore the change in the resonant frequencies with temperature of two different anharmonics associated with the same harmonic frequency such as the 1, 2, 1 and 1, 1, 2 or 1, 3, 1 and 1, 1, 3 modes will also be nominally the same.

In contrast, the frequency-force characteristics of anharmonics whose antinodes are angularly disposed to the X axis are not the same as the fundamental or anharmonics having their antinodes generally parallel to the X axis, therefore their change in resonant frequency with an applied force will be different. The difference in the resonant frequencies of the two modes can therefore be used to generate an output signal indicative of the applied force.

Referring to FIGS. 4 and 5, there is shown a force transducer 10 having a piezoelectric crystal such as an AT cut quartz crystal 12 mounted in a crystal holder 14. The crystal holder has an L shaped support structure 16 having a lower pad 18 attached to the upper surface of the horizontal portion of the support bracket. A cantilever spring assembly consisting of a pair of leaf springs 20 and 22 separated by spacers 24 and 26 has one end attached to the upright portion of the support port using a fastener such as threaded screw 28. A force transfer member 30 is mounted on the opposite end of the cantilever spring assembly by means of a threaded fastener such as screw 32 which passes through the two leaf springs 22 and 24 and spacer 26. The crystal 12 is mounted between the lower pad 18 and the force transfer member 30 with the X axis aligned between the force transfer member 30 and the lower pad 18. The crystal is held in place using any of the crystal holding techniques well known in the art.

Four (4) sets of electrodes, 36, 38, 40 and 42 are symmetrically disposed on the surfaces of the crystal 12 about its center. One electrode of each set is disposed on one surface of the crystal while a mating electrode is disposed on the opposite surface. Diagonally opposite electrode sets 36 and 40 are arranged generally in line with the X axis of the crystal while the diagonally opposite electrode sets 38 and 42 are arranged along the Z' axis of the crystal.

Referring now to FIG. 6, there is shown in block form, the electronic circuitry associated with the force transducer. The electrode sets 36 through 42 are located on the surfaces of the crystal 12 as shown in FIG. 4, but are shown out of position on FIG. 6 to simplify the schematic. The top electrode of set 36 is connected to the bottom electrode of set 40 and to an oscillator circuit 44 while the bottom electrode of set 36 is connected to the top electrode of set 40 and to oscillator circuit 44. Oscillator circuit 44 is a conventional crystal oscillator circuit which oscillates at the resonant frequency of the crystal as primarily determined by the electrical properties of the crystal, the crystal cut, thickness, and the geometry of the electrodes. With the arrangement of electrode sets 36 and 40 as shown in FIG. 4 and connected as shown in FIG. 6, the crystal 12 will preferentially resonate in the 1, 2, 1 anharmonic mode.

In a like manner the top electrode of set 38 is connected to the bottom electrode of set 42 and to oscillator 46. The top electrode of set 42 is connected to the bottom electrode of set 38 and to oscillator 46. Oscillator circuit 46 is identical to oscillator 44 and will oscillate at the resonant frequency determined by the geometry and placement of the electrodes and the way they are connected electrically. With the physical arrangement of electrode sets 38 and 42 shown in FIG. 4 and connected as shown in FIG. 6, the crystal will resonate in the 1, 1, 2 anharmonic mode, Signals $f_1$ and $f_2$ indicative of the resonant frequency of the crystal resonating in the 1, 2, 1 and 1, 1, 2 modes are respectively, extracted from oscillators 44 and 46 and are mixed in a mixer 48 which outputs a signal $f_3$ equal to the difference between the signals $f_1$ and $f_2$ such that $f_3 = f_1 - f_2$.

The operation of the circuit is as follows: With no force applied to the crystal other than the force exerted by the cantilever spring, the two crystal oscillators comprising crystal 12, electrode sets 36 and 40 connected to oscillator circuit 44 and electrode sets 38 and 42 connected to oscillator circuit 46 will cause the crystal to be simultaneously resonated in the 1, 2, 1 and 1, 1, 2 anharmonic modes. As previously discussed, the resonant frequencies of the two anharmonic modes are different, therefore, the signal $f_3'$ extracted from the mixer 48 is indicative of a zero force.

The application of a force F along the force sensitive axis of the crystal via the force transducer member 30 attached to the cantilever spring assembly will cause the frequencies of the two anharmonic resonant modes to change at a rate proportional to the applied force. However, as previously indicated, the change in frequency of the two orthogonal modes will be different such that with the applied force $$f_1 = f_1' + \Delta f_1$$

and $$f_2 = f_2' + \Delta f_2$$

where $\Delta f_1$ is different from $\Delta f_2$ and $f_1'$ and $f_2'$ are the resonant frequencies of the two orthogonal modes with a zero force applied. The output of the mixer 48 will then be a frequency $f_3$ equal to $$f_3 = f_1' + \Delta f_1 - f_2' - \Delta f_2$$

$$f_3 = f_3' + \Delta f$$

where $\Delta f = \Delta f_1 - \Delta f_2$.

The change in frequency $\Delta f$ of the signal $f_3$ is therefore a signal indicative of the applied force.

For some applications, it may be desirable to eliminate the zero force frequency difference $f_3'$ from the output of mixer 48.

This may be done with the circuit shown on FIG. 7. A third oscillator 49 generates a signal having a frequency $f_4$ equal to difference between the two frequencies $f_1'$ and $f_2'$ of oscillators 44 and 46 respectively with no external force applied to the force transducer. The signal $f_4$ is mixed in a second mixer 50 with the signal $f_1$ extracted from oscillator 44. The output of mixer 50 is a signal $f_5$ having a frequency equal to $f_1 - f_4$. The signal $f_5$ is again mixed in third mixer 51 with the signal $f_1$ to generate a signal $f_6$ equal to $f_1 + (f_1 - f_4)$. Mixer 52 mixes the signals $f_1$ and $f_2$ and outputs a signal $f_8$ equal to $f_1 + f_2$. The signals $f_6$ and $f_8$ are mixed in a fourth mixer 53 which outputs a signal $f_7$ equal to $f_6 - f_8$. However, $$f_6 = f_1 + f_1 - f_4$$

and $$f_8 = f_1 + f_2$$

therefore $$f_7 = (f_1 + f_1 - f_4) - (f_1 + f_2)$$

$$= f_1 - f_2 - f_4$$

$$= f_3 - f_3'$$

where $$f_3 = f_1 - f_2$$

$$f_3' = f_1' - f_2' = f_4$$

When no force is applied $f_3 = f_3'$ and $f_7 = 0$ With an applied force:

$$f_1 = f_1' + \Delta f_1$$

and $$f_2 = f_2' + \Delta f_2$$

then $$f_3 = (f_1' - f_2') + (\Delta f_1 - \Delta f_2) - (f_1' - f_2')$$
$$f_3 = \Delta f_1 - \Delta f_2 = \Delta f$$

The output of mixer 53 is then just the difference $\Delta f_1 - \Delta f_2$ which is the difference in the change in frequencies $f_1$ and $f_2$ with an applied force.

For other applications an analog signal may be desired. The output signal $f_3$ of mixer 48 may be converted to an analog signal as shown on FIG. 8. The mixer 48 receives the signals $f_1$ and $f_2$ from oscillators 44 and 46 and outputs a difference signal $f_3$ which is received by a clipper amplifier 54. Clipper amplifier 54 outputs the signal $f_3$ with a predetermined fixed amplitude. The amplified signal $f_3$ is received by a demodulator circuit 56 which outputs an analog signal having a value proportional to the frequency of the received signal $f_3$. Various types of demodulators capable of performing this function, such as those used in F.M. radios, are well known in the art. The analog output signal of the demodulator 56 is received at the positive input of a difference amplifier 58 having a reference signal applied to its negative (inverting) input. The reference signal has a value equal to analog equivalent of the zero force signal $f_3'$ so that the output of amplifier 58 is proportional to the signal $\Delta f$ indicative of the applied force.

Alternately, when a digital signal indicative of the force is required, the circuit shown in FIG. 9 may be used. The output signal $f_3$ from mixer 48 is received by a counter 60 which counts the number of cycles of the signal $f_3$ that occur in a predetermined time interval. The counting time interval is controlled by a count time control circuit which generates a signal activating the counter for the predetermined time interval. The predetermined count time is selected such that when no force is applied to the crystal, the counter will count a predetermined number of cycles. For example, if a 10 bit counter is used, the predetermined number of cycles would be 1024 which would effectively return the counter to zero counts. Any additional counts above this number, thereafter resulting from the increase in the frequency, $(\Delta f_1 - \Delta f_2)$ as a result of the applied force, will be stored in the counter as it is recycled and begins to count a second time.

It is recognized that other circuits may be used to achieve the same results. For example, a higher capacity counter could be used in which the higher order bits are ignored or an Up-Down counter may be used which initially counts down to a predetermined number, in response to the output of the mixer 48, then reverses and counts up for the remainder of the time interval. The circuit is arranged so that a number of cycles indicative of $f_3'$ produces a zero count in the counter as it is counting up from the predetermined number. The number of cycles counted thereafter is indicative of the change in frequency $\Delta f = \Delta f_1 - \Delta f_2$ due to the applied force.

The capacity of the counters and the counting intervals are directly dependent upon the frequencies of the anharmonics, the magnitude of the force range to be covered and the resolution of the force desired. Given these factors, a person skilled in the art would be capable of selecting a crystal which will resonate at appropriate anharmonic frequencies, selecting counters having the required count capacity and designing count time circuits capable of generating the required count time intervals. The mixers and counters are commercially available from a variety of sources, and the circuits for the oscillators and count time signal generators are well known in the art and can be found in text books as well as the handbooks distributed by the manufacturers of electronic components.

An alternate configuration of the electrode patterns on the surfaces of the crystal is shown on FIG. 10. Instead of the electrode arrangment shown on FIG. 4, the electrode patterns are separated as shown. As before, four sets of electrodes designated 64, 66, 68, and 70 are arranged on the crystals surface with one electrode of each set disposed directly beneath the associated electrode on opposite surfaces of the crystal. The electrode sets may be symmetrically arranged as shown on FIG. 10 if orthogonal anharmonic modes such as the 1, 1, 3 and 1, 3, 1 are used, but may be disposed at different angles when higher order anharmonics are used which are not orthogonal to each other. The diametrically opposite sets of electrodes such as electrode sets 64 and 68 and electrode sets 66 and 70 are externally connected together as shown on FIG. 11. The two diametrically opposite electrodes, 64 and 68, on the same surface of the crystal are connected together and likewise the two associated electrodes on the opposite surface are connected together. The commonly connected electrodes are further connected to the oscillator 72 as shown. The placement of the electrode sets 64 and 68, and the manner in which they are connected for example will cause the crystal to resonate in the 1, 3, 1 anharmonic mode with the first and third anti-nodes coincident with the electrode sets. In a like manner, the two diametrically opposite electrodes 66 and 70 on the same surface of the crystal are electrically connected, and similarly the two associated electrodes on the opposite surface are connected together. The commonly connected electrodes are further connected to oscillator 74 as shown.

Figure 12:
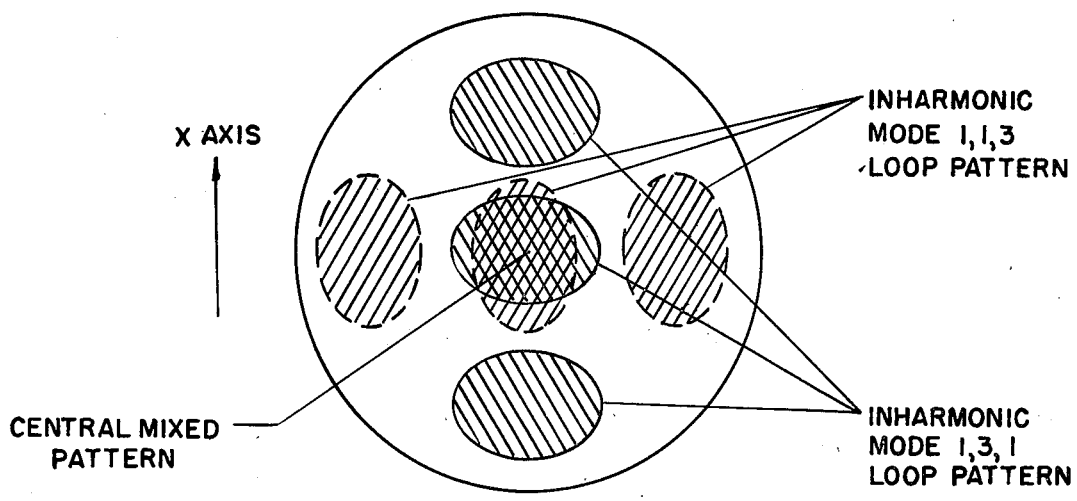
FIG. 12 is a front view of the crystal showing the anti-node formation of the two inharmonic resonant modes.

The placement of electrode sets 66 and 70 and the manner in which they are connected cause the crystal to resonate in the 1, 1, 3 anharmonic mode. The first and third anti-nodes of the 1, 1, 3 anharmonic resonant frequency occur coincident with electrode sets 66 and 70. The second anti-node of both anharmonic frequencies occur in the central area between the four sets of electrodes as illustrated in FIG. 12.

The two anharmonic frequencies $f_1$ and $f_2$ are extracted from oscillators 72 and 74 and mixed in a mixer 76, in the same manner as described in detail with reference to FIG. 6, which produces a signal $f_3$ having a frequency equal to the difference between the two anharmonic frequencies. Additional circuits such as shown on FIGS. 7 through 9 may be used to produce the output signal $f_3$ in the desired form.

In FIG. 4, the force is shown as being applied in a direction parallel with the X axis of the crystal 12, however, to maximize the frequency difference due to the applied force, i.e. $\Delta f = \Delta f_1 - \Delta f_2$ or for other reasons known in the art, it may be desirable to apply the force at an angle $\theta$ with respect to the X axis of the crystal as shown on FIG. 13. Because of the complex behavior of the crystal, this angle is more readily determined experimentally than through rigorous mathematical analysis.

The disclosed force transducer may be embodied in a variety of sensors, such as a pressure sensor as illustrated in FIG. 14 or an accelerometer as shown in FIG. 15.

Referring to the pressure sensor embodiment of FIG. 14, the crystal 12, having electrode patterns as shown on FIGS. 4 or 10 is mounted inside an enclosed vacuum chamber. The vacuum chamber comprises a cup-shaped housing 78 having a flexible diaphram 90 enclosing its open end. The crystal 12 is mounted between lower pad 18 and a force transfer member 30 as discussed with reference to FIG. 4. The force transducer member 30 is mounted to a plate 80 which has a rod 82 having a flange 84 at its opposite end. The force transfer member 30 is held against the crystal 12 by means of a force exerted by a compressed spring 86 abutting plate 80 at one end and a retainer, such as "C" ring 88 at the other end. The "C" ring 88 is disposed in a peripheral slot or groove provided in the internal surface of housing 78.

The flexible diaphram 90 covering the open end of the housing 78 completes the vacuum chamber. The diaphram 90 may be sealed to the housing by welding or any other method known in the art. When the seal is accomplished by welding, such as T.I.G. welding, the upper edge of the housing may have an undercut 92 providing lips 94 to facilitate the weld. The length of the rod 82 is selected so that the flexible diaphram 90 contacts the flange 84 when there is no pressure differential across the diaphram.

Four electrically isolated feedthroughs such as feedthroughs 96 and 98 are provided through the base of the housing 78 permitting electrical contact to the electrodes on the crystal 12, therethrough.

The pressure sensor may include a lower housing 100 attached to the base of the housing 78 in which a circuit board 102 is mounted. The oscillators 44 and 46 and the mixer 48 shown on FIG. 4 are mounted on the circuit board 102. A multi-conductor lead 104 passing through lower housing 102 permits electrical power to be communicated to the three circuits mounted on the circuit board and provides a lead by which the generated signal $f_3$ can be communicated to the utilization device.

In operation, the chamber formed by the housing 78 and flexible diaphram 90 is evacuated to a pressure indicative of a vacuum.

The external pressure, acting on the diaphram 90 urges the diaphram towards the crystal with a force "F" equal to the product of the pressure and the cross-sectional area of the diaphram. This force is communicated to the crystal 12 via rod 82 and the force transfer member 30 and is added to the force exerted by the spring 86 acting on plate 80. As the external pressure on the flexible diaphram changes, the force applied to the crystal and the output signal $f_3$ will change as a function of the force as previously described with reference to FIG. 4. The force on the crystal exerted by spring 86 is equivalent to the force exerted by the cantilever spring assembly discussed with reference to FIG. 4.

Because the crystal 12 is relatively inelastic, the displacement of diaphram 90 with changes in the external pressure is constrained reducing the edge effect distortions normally encountered in other types of flexible diaphram pressure sensors in which the unconstrained displacement of the diaphram is a function of the pressure measured. This results in a more linear device.

Referring to accelerometer embodiment shown on FIG. 15, a crystal 12 having electrode patterns on its surfaces as discussed with reference to FIG. 4, is mounted in a housing 106 between a lower pad 18 and a force transfer member 30. The force transfer member is attached to a spider member 108 which resiliently holds the force transfer member 30 against the crystal with a predetermined force $F_p$. A weight or mass 110 is also attached to the spider 108 by means of a fastener, such as threaded screw 112 which is threadably received in the force transfer member as shown. The force $F_p$ exerted by the spider 108 is selected so that it is larger than the force $F_a$ capable of being exerted by the mass 110 when it is accelerated either towards or away from the crystal at the maximum acceleration to be measured.

$F_p = KF_a$ = Mass X acceleration
where K > 1

To improve the overload and shock tolerance of the accelerometer, a separate low mass resilient means may be provided to maintain a fixed preload on the crystal 12 holding it in place during overload and shock conditions which would otherwise cause the crystal to become unseated.

Again four feedthroughs, such as feedthroughs 114 through 120, are provided to make electrical contact to the electrodes on the surfaces of the crystal. The accelerometer may also have a lower housing (not shown) encasing the oscillators and associated electronic circuitry such as housing 110 discussed relative to FIG. 14. A cover such as cover 122 protects the open end of the accelerometer and crystal from atmospheric contaminants.

The operation of the accelerometer is as follows: when the accelerometer is at rest or moving at a uniform velocity, the only forces acting on the crystal 12 is the force $F_p$ exerted by the spider 108 and the gravitational force of weight 110. The crystal is simultaneously resonated in the two different modes and the signals $f_1$ and $f_2$ are indicative of the frequencies of the two resonant frequencies. The output of the mixer 48 is a signal $f_3'$ having a frequency equal to the difference between these two frequencies and is indicative of the at rest state.

When the accelerometer is accelerated in the direction of arrow 122, the mass 110 exerts a force $F_a$ equal to the mass of the weight 110 times the acceleration. The force $F_a$ is added to $F_p$ and the two resonant frequencies of the crystal change accordingly causing a change in the frequency $f_3$ indicative of the change in force applied to the crystal. Since the weight 110 is a constant, the change in $f_3$ is indicative of the value of the acceleration. When the acceleration is in a direction opposite that of arrow 122, the force acting on the crystal 12 is $F_p - F_a$ and results in changes in the two resonant frequencies $f_1$ and $f_2$ such that the difference is less than $f_3'$. The change in $f_3$ is indicative of the value of the acceleration in the opposite direction.

Having disclosed the invention with regards to several embodiments, it is not intended that the invention be limited to the embodiments illustrated and discussed herein.

It is recognized that one skilled in the art may select different anharmonic resonant frequencies, and may design other electrode patterns or electronic circuits to generate a signal indicative of the force applied to the crystal from the shift of the anharmonic frequencies without departing from the spirit of the invention. It is also recognized that other transducer configurations may be conceived using the concepts disclosed herein.

What is claimed is:

1. A force transducer comprising:
    a piezoelectric crystal having two opposite surfaces and a predetermined thickness, said surfaces lying generally along orthogonal axes determined from the structure and cut of the crystal, where a force applied to the crystal in the direction of one of said axis produces a shift in the crystals resonant frequency; said crystal having at least two different electrode sets disposed on the surfaces of said crystal;

means for holding said crystal in a predetermined position, and for applying a received external force to said crystal at a predetermined angle with reference to said one axis;

first oscillator means connected to one of said two sets of electrodes for resonating said crystal at a first resonant frequency, said first resonant frequency being variable as a first function of the applied force;

second oscillator means connected to said other set of electrodes for resonating said crystal at a second resonant frequency indicative of an anharmonic resonant frequency having more than one resonant antinode lying in a direction angularly disposed to said one axis, said anharmonic resonant frequency being variable as a second function of the received force different from said first function;

means responsive to said first and second resonant frequencies for generating a signal indicative of the received force.

2. The force transducer of claim 1 wherein said first oscillator resonates said crystal at a fundamental resonant frequency.

3. The force transducer of claim 2 wherein both said first and second oscillators resonate said crystal in anharmonic modes.

4. The force transducer of claim 3 wherein said first and second oscillators resonate said crystal in the anharmonic modes 1, 1, n and 1, n, 1 respectively where n is an integer.

5. The force transducer of claim 4 wherein said piezoelectric crystal is an AT-cut quartz crystal having an X and a Z' axis and said at least two sets of electrodes are four sets of electrodes symmetrically disposed about the center of said quartz crystal, one diametrically opposite pair of sets of electrodes is disposed along said X axis, and is connected to said first oscillator means, the other diametrically opposite pair of sets of electrodes is disposed along said Z' axis and is connected to said second oscillator means.

6. The force transducer of claim 1 wherein said means for holding applies the received force to said crystal in a direction parallel to said one axis.

7. The force transducer of claim 1 wherein said means for applying a force, applies a force to said crystal at an angle $\theta$ to said one axis, where the angle $\theta$ lies in the plane defined by said orthogonal axes.

8. The force transducer of claim 1 wherein said means for generating a signal includes means for generating a signal having a frequency indicative of the applied force.

9. The force transducer of claim 1 wherein said means for generating a signal includes means for generating an analog signal indicative of the applied force.

10. The force transducer of claim 1 wherein said means for generating a signal includes means for generating a digital signal indicative of the applied force.

11. The force transducer of claim 1 further including a sealed chamber having a predetermined internal pressure enclosing said force transducer, said sealed chamber having a member attached to said means for holding and applying for generating a force proportional to the difference between said internal pressure and a pressure external to said member.

12. The force transducer of claim 11 wherein said sealed chamber has an internal pressure indicative of a vacuum.

13. The force transducer of claim 1 further including a predetermined mass attached to said means for holding and applying such that said predetermined mass applies to said means for holding and applying a force proportional to an accelerating field to said force transducer in a direction parallel to said one axis.

14. A force transducer comprising:
a piezoelectric crystal;
means for applying a force to be determined to said piezoelectric crystal;
first means for resonating said piezoelectric crystal in a first resonant mode having a first frequency-force characteristic to generate a first resonant frequency variable as a function of the applied force;
second means for simultaneously resonating said same piezoelectric crystal in a second resonant mode having a second frequency-force characteristic different from said first frequency-force characteristic to generate a second resonant frequency variable as a function of the applied force;
means responsive to said first and second resonant frequencies for generating a signal indicative of the applied force.

15. The force transducer of claim 14 wherein said piezoelectric crystal has a first axis along which an applied force produces a change in said first resonant frequency as a function of the applied force, said second resonant mode is an anharmonic mode having more than one resonant antinode along a second axis angularly disposed to said first axis.

16. The force transducer of claim 15 wherein said first resonant mode is an anharmonic mode having more than one resonant antinode.

17. The force transducer of claim 16 wherein said piezoelectric crystal is an AT-cut quartz crystal and said first axis is the X axis of the quartz crystal and said second axis is the Z' axis of said quartz crystal.

18. The force transducer of claim 17 wherein said means for applying a force applies said force along said X axis.

19. The force transducer of claim 17 wherein said means for applying a force applies said force at a predetermined angle to said X axis in a plane parallel to the plane defined by said X and Z' axes.

20. The force transducer of claim 14 further including a sealed housing enclosing said force transducer, said sealed housing having a member attached to said means for applying a force for generating a force proportional to the difference between the pressure inside said sealed housing and a pressure external to said member.

21. The force transducer of claim 20 wherein said sealed housing has an internal pressure indicative of a vacuum.

22. The force transducer of claim 14 further including a predetermined mass attached to said means for applying a force such that said predetermined mass applies to said means for applying a force a force proportional to an accelerating field to said force transducer.

23. A method for generating a signal proportional to an applied force comprising the steps of
applying a force to a piezoelectric crystal in a direction operative to change at least one of the crystal's resonant frequencies;

resonating said crystal in a first resonant mode having a first frequency-force characteristic to generate a first signal having a frequency variable as a function of the applied force;

simultaneously resonating said crystal in a second resonant mode having a second frequency-force characteristic different from said first frequency-force characteristic to generate a second signal having a frequency variable as a function of the applied force;

combining said first and second signals to generate a third signal indicative of the applied force.

24. The method of claim 23 wherein said step of simultaneously resonating resonates said crystal in an anharmonic mode having more than one antinode.

25. The method of claim 24 wherein said step of resonating resonates said crystal in an anharmonic mode having more than one antinode.

26. The method of claim 25 wherein said piezoelectric crystal is an AT-cut quartz crystal having an X and Z' axes, said step of applying a force applies said force at a predetermined angle to said X axis.

27. The method of claim 26 wherein said step of applying a force applies said force parallel to said X axis.

28. The method of claim 26 wherein said step of resonating resonates said crystal in the 1, n, 1 anharmonic mode and said step of simultaneously resonating resonates said crystal in the 1, 1, n anharmonic mode.

29. The method of claim 23 wherein said step of combining said first and second signal to generate said third signal includes the step of mixing said first and second signals and extracting said third signal indicative of the difference between said first and second signals.

30. The method of claim 29 further including the step of demodulating said third signal to generate an analog signal indicative of the applied force.

31. The method of claim 29 further including the step of converting said third signal to a digital number indicative of the applied force.

* * * * *